US006149998A

United States Patent [19]
Hettinga

[11] Patent Number: 6,149,998
[45] Date of Patent: *Nov. 21, 2000

[54] HEAT LAMINATED FABRIC HINGE AND METHOD OF MAKING SAME

[76] Inventor: Siebolt Hettinga, 2123 NW. 111th St., Des Moines, Iowa 50325-3788

[ * ] Notice: This patent issued on a continued prosecution application filed under 37 CFR 1.53(d), and is subject to the twenty year patent term provisions of 35 U.S.C. 154(a)(2).

[21] Appl. No.: 09/042,340

[22] Filed: Mar. 13, 1998

[51] Int. Cl.[7] ................................ B32B 3/10; B32B 5/22; B32B 27/12

[52] U.S. Cl. ......................... 428/44; 428/317.9; 442/286; 160/231.1; 264/345; 156/308.4; 156/309.6; 156/309.9; 156/322

[58] Field of Search .................................. 428/44, 317.9; 442/286; 160/231.1; 264/345; 156/309.6, 309.9, 308.4, 322

[56] References Cited

U.S. PATENT DOCUMENTS

| | | | |
|---|---|---|---|
| 4,222,428 | 9/1980 | Scherer | 160/231 R |
| 4,493,118 | 1/1985 | Braxton | 4/460 |
| 4,885,820 | 12/1989 | Erceg et al. | 16/225 |
| 5,336,460 | 8/1994 | Hettinga | 264/251 |
| 5,762,852 | 6/1998 | Hettinga | 264/251 |

FOREIGN PATENT DOCUMENTS

| | | |
|---|---|---|
| 6-8685 | 1/1994 | Japan . |
| 10-299319 | 11/1998 | Japan . |
| 0323189 | 12/1929 | United Kingdom . |

*Primary Examiner*—Blaine Copenheaver
*Assistant Examiner*—John J. Guarrello
*Attorney, Agent, or Firm*—Brian J. Laurenzo; Michael C. Gilchrist

[57] ABSTRACT

A heat laminated fabric hinge and a method of making same, where the heat laminated fabric hinge comprises a first member with a hinge attachment surface, a second member with a hinge attachment surface, and a fabric hinge member. The fabric hinge member is secured to the hinge attachment surfaces of the first and the second members by heat lamination, whereby at least some of the fibers of the fabric hinge member are embedded within the hinge attachment surfaces of the first and the second members. The heat laminated fabric hinge is produced by arranging the fabric hinge member and the first and the second members such that the fabric hinge member is in contact with the hinge attachment surfaces of the first and the second members, a heating element is applied to the fabric hinge member until the hinge attachment surfaces become pliable enough to receive at least some of the fibers of the fabric hinge member, and at least some of the fibers of said fabric hinge member embed into the hinge attachment surfaces of the first and second members.

26 Claims, 13 Drawing Sheets

HEAT LAMINATED FABRIC HINGE AND METHOD OF MAKING SAME

BACKGROUND OF THE INVENTION

The invention relates to a heat laminated fabric hinge and a method for making the heat laminated fabric hinge, and in particular to a method of embedding the fibers of a fabric hinge member into hinge attachment surfaces of a first and a second member by heating the hinge attachment surfaces to a temperature whereby the hinge attachment surfaces become pliable enough to receive at least some of the fibers of the fabric hinge member.

Traditionally, hinges have been constructed of metal. Metal hinges, however, suffer from a number of drawbacks. Metal hinges do not function well when repeatedly exposed to harsh or corrosive chemicals. For example, hinges used for automotive applications are often exposed to grime and dirt, chemicals applied to road surfaces, and chemicals used in association with the internal operation of the automobile. Over time, interaction between the hinge members and the surrounding environment severely deteriorate the hinge. Therefore, metal hinges require periodic cleaning or even replacement.

Even under ideal conditions metal hinges experience significant wear. The various members of the hinge wear against each other causing damage to the metal surfaces. Often over time the hinges cease to operate silently, and begin to squeak or creak when in operation. This effect is exacerbated when the hinge undergoes load stress. The stress tends to warp and bend the hinge, which in turn increases the wear and tear on the hinge. As a results, metal hinges require periodic lubrication and/or realignment. Furthermore, the actual bulk and size of some of the hinges can create an impediment to the flexibility of the hinge. In some cases, the range of motion of the hinge members is restricted by the hinge itself.

In response to these and other problems, alternatives to the traditional metal hinge have been developed. In some cases, hinges can be constructed of nonmetal materials and secured through the use of adhesives and solvents. However, adhesives and solvents also are susceptible to the corrosive effects of chemicals. Additionally, the adhesives and solvents narrow the range of acceptable materials. Many materials, including thermoplastic materials, resist bonding with solvents and adhesives, and other materials tend to delaminate or separate from these bonds. Still other materials tend to harden or become brittle when exposed to adhesives or solvents.

U.S. Pat. No. 5,336,460 discloses a method of making an injection molded hinge that utilizes a deformable lamina comprised of woven or non-woven textile, vinyl, or film. The process involves the manipulation of a large injection molding apparatus with a large fixed mold unit. Thus, changes to the configuration of the hinge require retooling the mold apparatus with a new mold unit. The size of the apparatus somewhat reduces the flexibility for producing a wide variety and styles of hinges. This method of production requires producing the articles in a specific location, under specific predetermined conditions, for later distribution to the site of actual use.

SUMMARY OF THE INVENTION

An object of the present invention comprises providing a heat laminated fabric hinge with superior corrosion resistant properties.

Another object of the present invention comprises providing a heat laminated fabric hinge capable of long lasting silent, and low maintenance, operation.

An additional object of the present invention comprises providing a heat laminated fabric hinge capable of long lasting operation without excessive wear of the hinge components.

Another object of the present invention comprises providing a heat laminated fabric hinge secured with a long lasting durable bond without the use of adhesives or solvents.

Yet another object of the present invention comprises providing a heat laminated fabric hinge capable of construction with a wide variety and type of materials.

A further object of the present invention comprising providing a method to make a heat laminated fabric hinge that can be used to produce heat laminated hinges with a wide variety of configurations.

These and other objects of the present invention will become apparent to those skilled in the art upon reference to the following specification, drawings, and claims.

The present invention intends to overcome the difficulties encountered heretofore. To that end, the present invention comprises a heat laminated fabric hinge having a first member with a hinge attachment surface, and a second member with a hinge attachment surface, secured by heat lamination to a fabric hinge member. The heat laminated fabric hinge is made by first arranging the first member, the second member, and the fabric hinge member in the configuration of final assembly. A heating element is applied to the fabric hinge member until the hinge attachment surfaces of the first and the second members become pliable to receive at least some of the fibers of the fabric hinge member. At least some of the fibers of the fabric hinge member embed within the hinge attachment surfaces of the first and the second members under the application of pressure and heat by the heating element.

DETAILED DESCRIPTION OF THE INVENTION

Figure 15A:
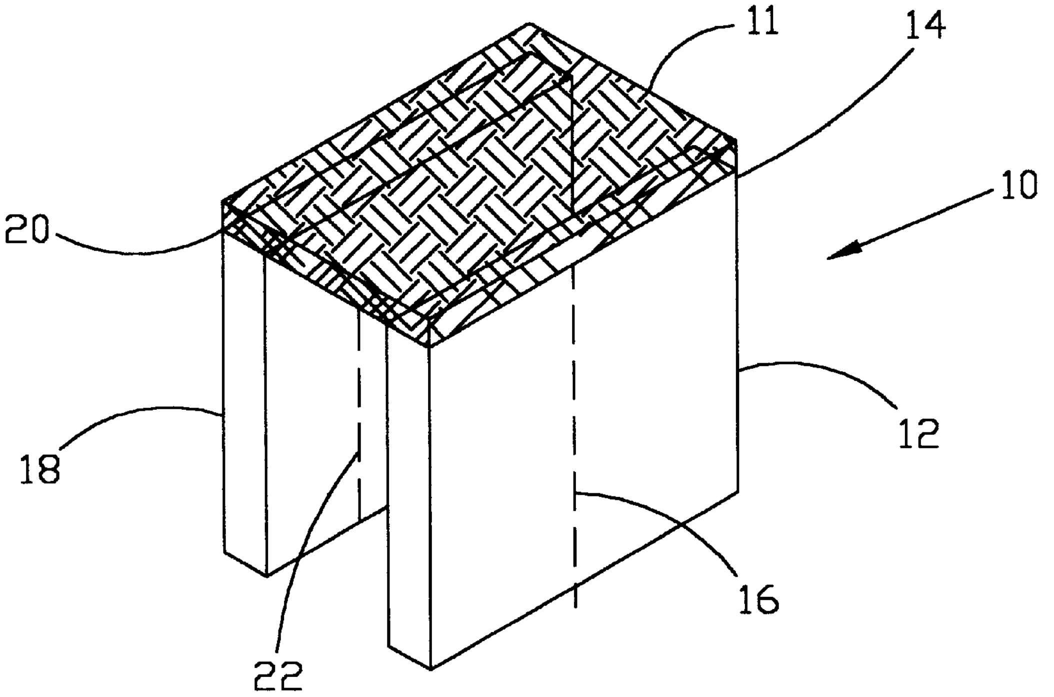
FIG. 15 is a perspective view of the assembled heat laminated fabric hinge of FIG. 14.

In the figures, FIG. 15*a* shows a heat laminated fabric hinge 10. The heat laminated fabric hinge 10 comprises a first member 12 and a second member 18. In a preferred embodiment of the present invention, the first member 12 and the second member 18 are comprised of a thermoplastic material. The first member 12 of the heat laminated fabric hinge 10 also contains a hinge attachment surface 14, and in a similar fashion the second member 18 of the heat laminated fabric hinge 10 contains a hinge attachment surface 20. The hinge attachment surfaces 14, 20 are designed to receive a fabric hinge member 11. The heat laminated fabric hinge 10 is made according to the following method.

Figure 16A:
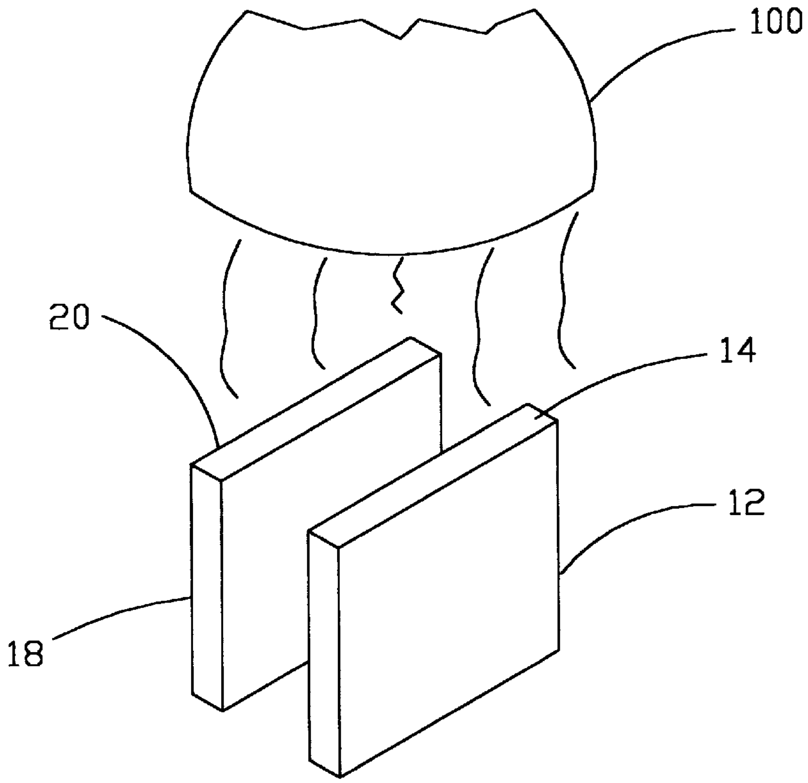
FIG. 16*a* is a perspective view of the first member and second member of the heat laminated fabric hinge of FIG. 15 during a pre-heating step.
Figure 16B:
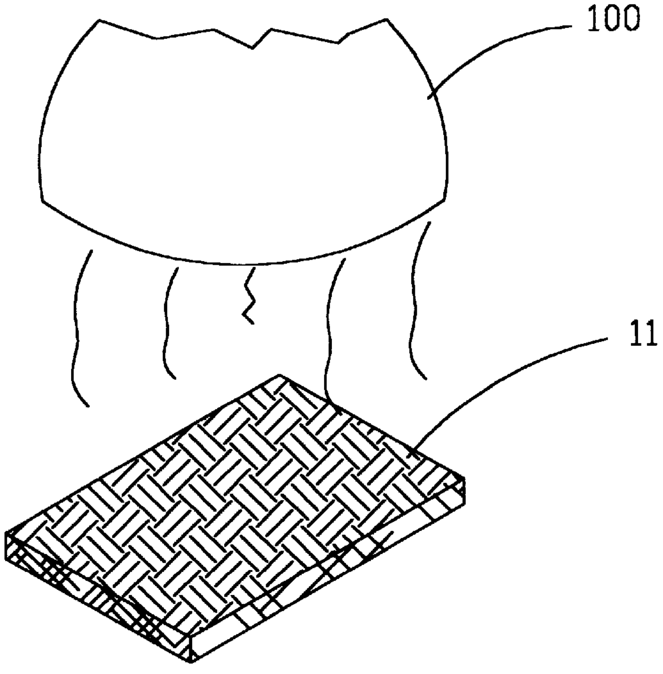
FIG. 16*b* is a perspective view of the fabric hinge member of the heat laminated fabric hinge of FIG. 15 during a pre-heating step.

In the first step of the process shown in FIGS. 16*a–b,* the hinge attachment surfaces 14, 20 of the first member 12 and the second member 18 of the heat laminated fabric hinge 10 are preheated by the preheating means 100. In the preferred embodiment of the present invention the first member 12 and the second member 18 of the heat laminated fabric hinge 12 are preheated to approximately 95% of a melt temperature in Fahrenheit of the hinge attachment surfaces 14, 20 of the first member 12 and the second member 18 of the heat laminated fabric hinge 10. Also FIG. 16*b* shows the preheating of the fabric hinge member 11. The fabric hinge member 11 is also preheated to approximately 95% of the melt temperature in Fahrenheit of the hinge attachment surfaces 14, 20 of the first member 12 and the second member 18 of the heat laminated fabric hinge 10. The preheating step allows for an even distribution of heat throughout the hinge attachment surfaces 14, 16 of the first member 12 and the second member 18 of the heat laminated fabric hinge 10, and the fabric hinge member 11. The preheating creates a deep heat penetration prior to the lamination process.

Figure 13:
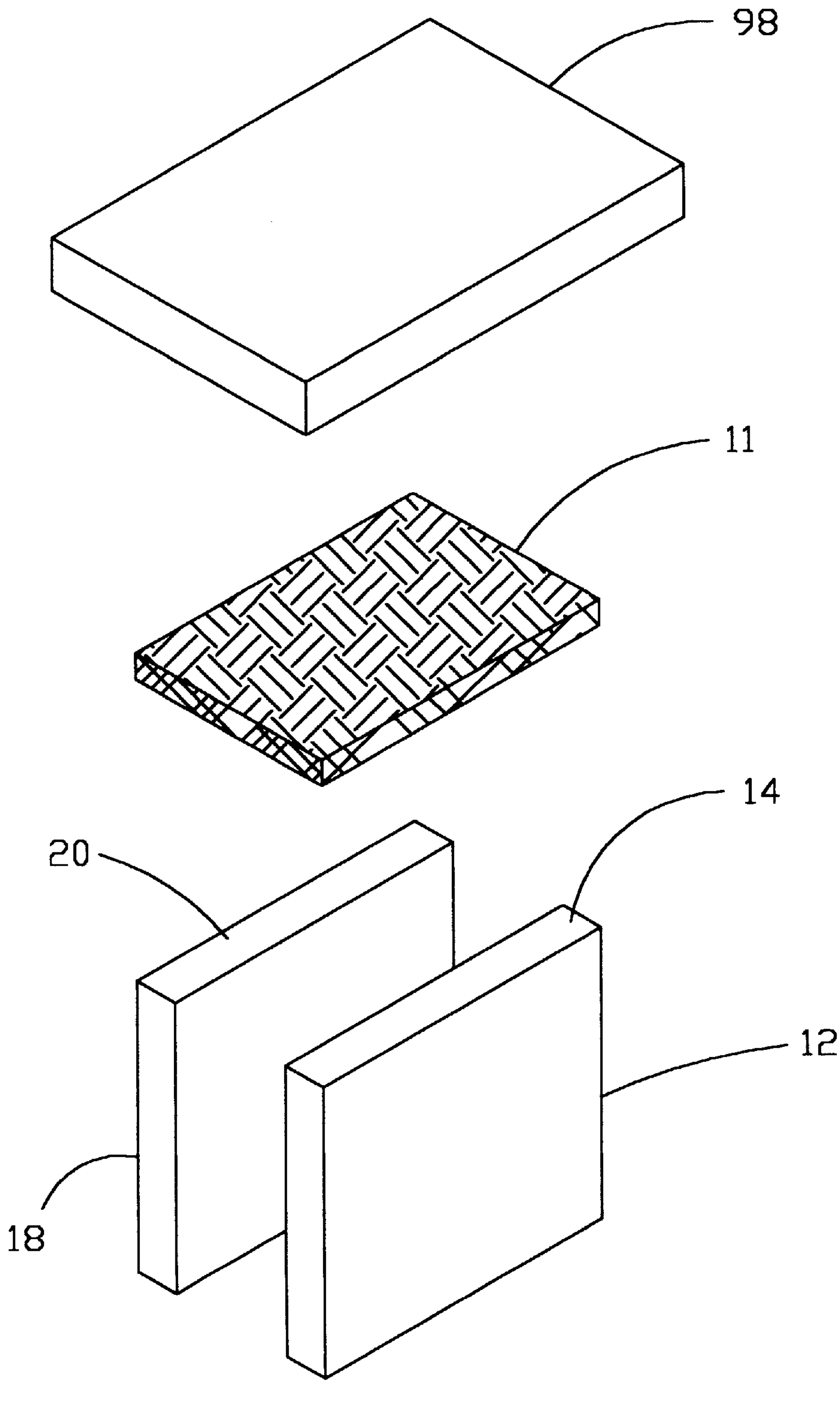
FIG. 13 is a perspective view of the components of a heat laminated fabric hinge, during an arranging step.

The next step in the process, shown in FIG. 13, comprises arranging the first member 12, the second member 18, and the fabric hinge member 11 of the heat laminated fabric hinge 10 in an orientation required for final assembly. In other words, the fabric hinge member 11 is placed in contact with the hinge attachment surface 14 of the first member 12 and the hinge attachment surface 20 of the second member 18.

Figure 14:
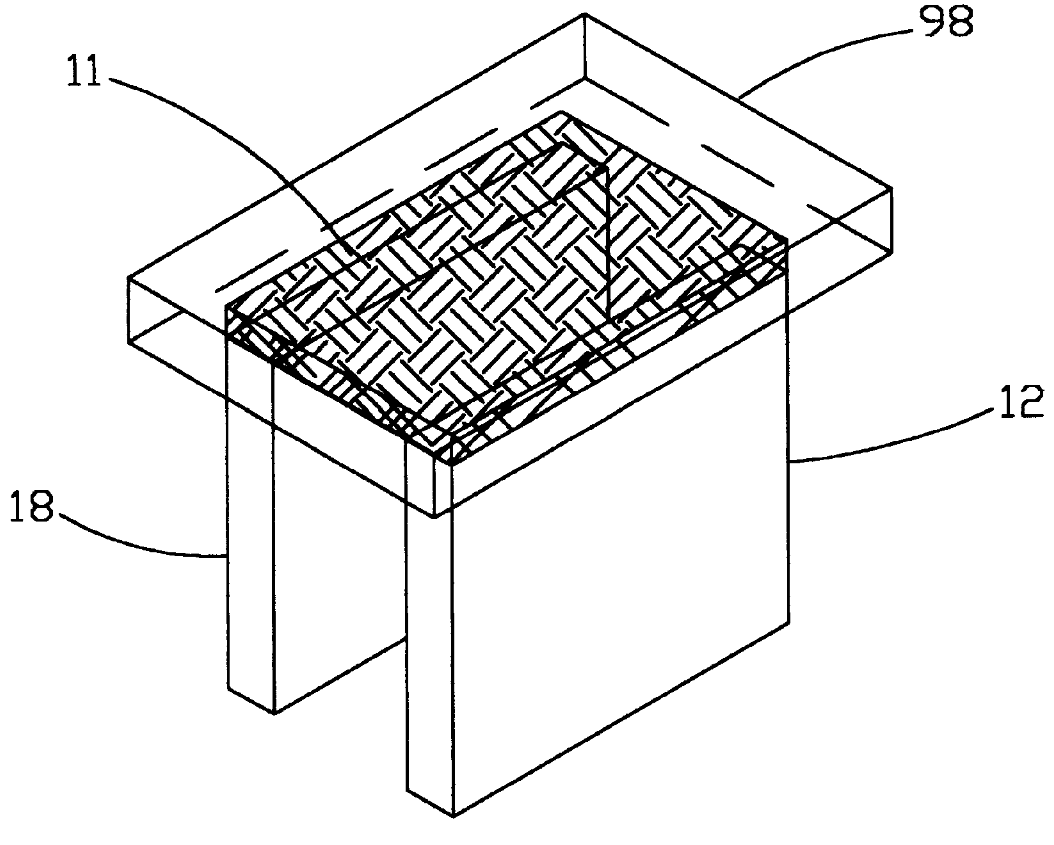
FIG. 14. is a perspective view of the heat laminated fabric hinge of FIG. 13 during an application of heat step.

Next, shown in FIG. 14 a heating element 98 is applied to the heat laminated fabric hinge 10 thereby creating pressure and that forces the heat laminated fabric hinge member 11 into contact with the hinge attachment surface 14 of the first member 12 and the hinge attachment surface 20 of the second member 18. In the preferred embodiment of the invention the heating element 98 is heated to a temperature of approximately 105% of the melt temperature in Fahrenheit of the hinge attachment surfaces 14, 20 of the first member 12 and the second member 18 of the heat laminated fabric hinge 10. In this manner, the heating element 98 heats the hinge attachment surfaces 14, 20 to a temperature whereby the hinge attachment surfaces 14, 20 of the first member 12 and the second member 18 become pliable enough to securably receive at least some of the fibers of the fabric hinge member 11. As the hinge attachment surfaces 14, 20 become pliable, and under the pressure of the heating element 98, at least some of the fibers of the fabric hinge member 11 embed within the hinge attachment surfaces 14, 20 of the first member 12 and the second member 18 of the heat laminated fabric hinge 10. The pressure required to embed the fibers of the heat laminated fabric hinge 10 into the hinge attachment surfaces 14, 20 will vary depending on the type of fabric used, the type of material used for the first member 12 and the second member 18, and the exact temperature of the heating element 98. Precise and uniform control of the temperature of the heating element 98, and the temperature at the preheating means 100, is required to keep the heat from deforming the hinge attachment surfaces 14, 18 of the first member 12 and the second member 18 of the heat laminated fabric hinge 10 as the fibers of the fabric hinge member 11 are embedded into the surface of the hinge attachment surfaces 14, 20.

In the preferred embodiment of the invention the heating element 98 comprises an electrical contact heater. However, it is anticipated that those of ordinary skill in the art will understand that numerous other types and arrangements of heating elements 98 are possible. The preheating means 100 in the preferred embodiment of the invention comprises a halogen heat lamp source. However, the preheating step could be performed with a conventional oven or other similar or equivalent heating devices. It is anticipated that those of ordinary skill in the art will understand that numerous other types and arrangements of pre-heating means are possible.

Figure 11A:
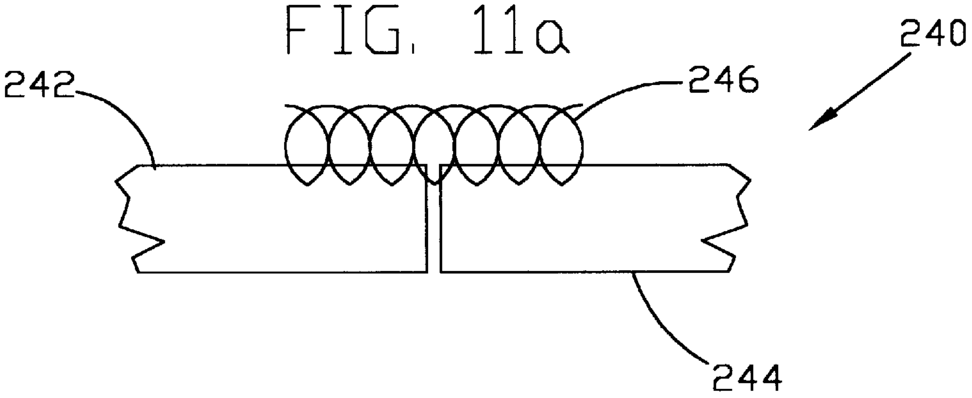
FIG. 11*a* is a side elevation view of a heat laminated fabric hinge with a non-woven fabric hinge member.
Figure 11B:
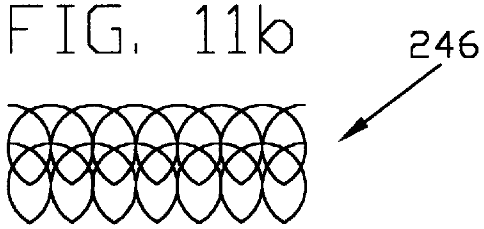
FIG. 11*b* is a side elevation view of the non-woven fabric hinge member of FIG. 11*a.*
Figure 12:
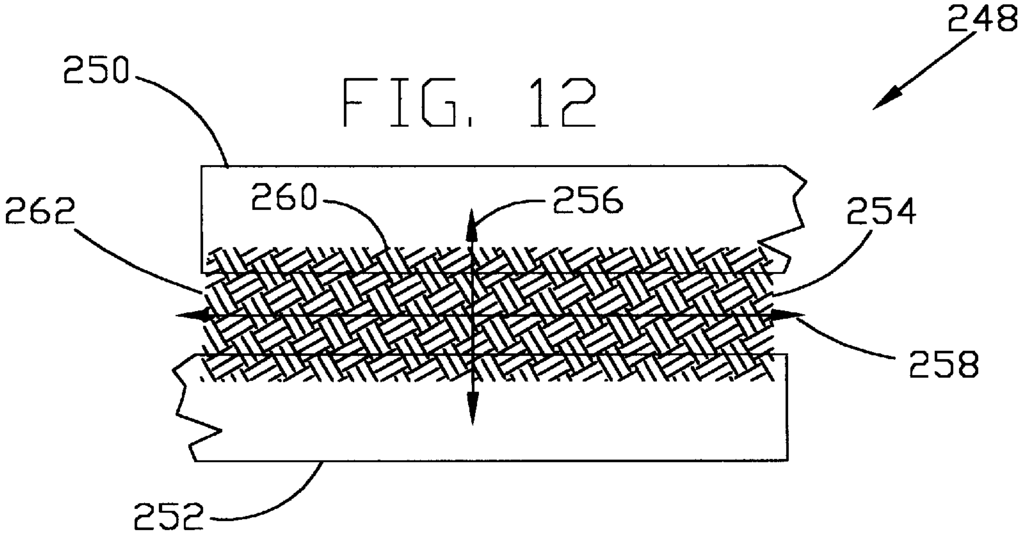
FIG. 12 is a side elevation view of a heat laminated fabric hinge with a woven fabric hinge member.

FIG. 11*a* shows a heat laminated fabric hinge 240 with a first member 242, a second member 244, and a non-woven fabric hinge member 246. The non-woven fabric hinge member 246 is comprised of either a number of randomly positioned fibers, or a few long randomly looping fibers (FIG. 11*b*). The advantage of the non-woven fabric hinge member 246 is that the heat laminated fabric hinge 240 can bear a load equally well in any direction due to the random orientation of the fibers within the non-woven fabric hinge member 90. FIG. 12 shows a heat laminated fabric hinge 248 comprised of a first member 250, a second member 252, and a woven fabric hinge member 254. The woven fabric hinge member 254 contains a first set of fibers 260 oriented along a first axis 256, and a second set of fibers 262 oriented along a second axis 258, such that the first axis 256 and the second axis 258 are transversely oriented to each other (FIG. 12). Manipulation of the orientation of the woven fabric hinge member 254 as well as manipulation of the warp, woof, and denier of the woven fabric hinge member 254 will affect the load bearing characteristics of the laminated in fabric hinge 248. For example, using strong lengthwise fibers oriented along one of the axes 256, 258 of the woven fabric hinge member 254 can enhance the load bearing characteristics along that axis. Of course, the woven fabric hinge member 254 can be oriented such that the second axis 258 orients transversely to the first and second members 250, 252. This configuration can strengthen the extruded-in fabric hinge 248 to prevent the first and second members 250, 252 from moving relative to each other in a direction transverse to the direction of pivoting. It is contemplated that the non-woven fabric hinge member 246 and the woven fabric hinge member 254 can be constructed from a wide range of fabrics, including fabrics that contain carbon fibers, ceramic fibers, natural fibers, plastic fibers, or even Teflon coated fibers that will create a non-stick effect.

Figure 15B:
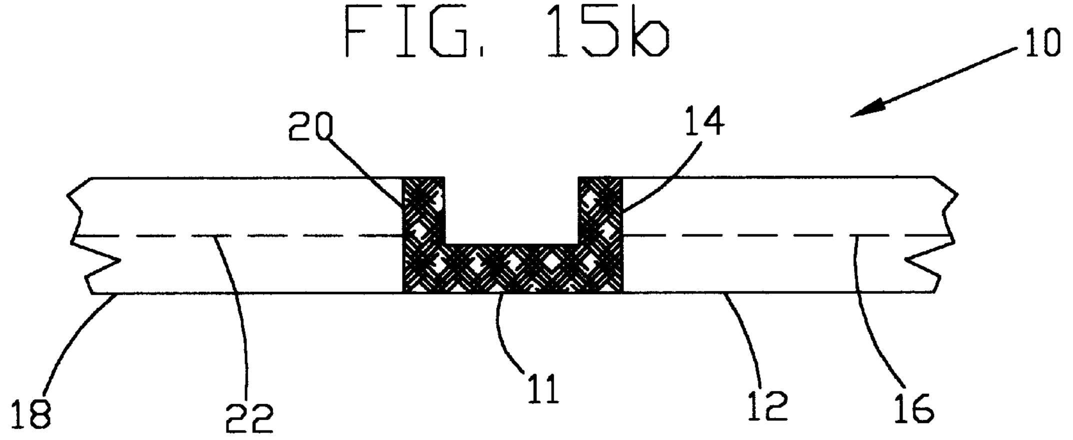

Heat laminated fabric hinges constructed according to the aforementioned process can take on many forms and orientations. FIG. 15*a* shows one such embodiment of a heat laminated fabric hinge 10. The heat laminated fabric hinge 10 is comprised of a first member 12 with a hinge attachment surface 14, and a second member 18 with a hinge attachment surface 20. The heat laminated fabric hinge 10 also contains a fabric hinge member 11. The first member 12 of the heat laminated fabric hinge 10 also contains a longitudinal axis 16 that is oriented substantially perpendicular to the hinge attachment surface 14 of the first member 12 of the heat laminated fabric hinge 10. Additionally, the second member 18 contains a longitudinal axis 22 that is oriented substantially perpendicular to the hinge attachment surface 20 of the second member 18 of the heat laminated fabric hinge 10. FIG. 15*a* shows the heat laminated fabric hinge 10 in an orientation where the longitudinal axis 16 of the first member 12 and the longitudinal axis 22 of the second member 18 are substantially parallel to each other. FIG. 15*b* shows the heat laminated fabric hinge 10 in a position where the longitudinal axis 16 of the first member 12 and the longitudinal axis 22 of the second member 18 are substantially coaxial to each other. Thus, the heat laminated fabric hinge 10 depicted in FIGS. 15*a–b* pivots between a position where the longitudinal axes 16, 22 are substantially parallel to each other and a position where the longitudinal axes 16, 22 are substantially coaxial to each other. In this manner, the first member 12 and the second member 18 of the heat laminated fabric hinge 10 pivots through approximately 180° of rotation.

Figure 2A:
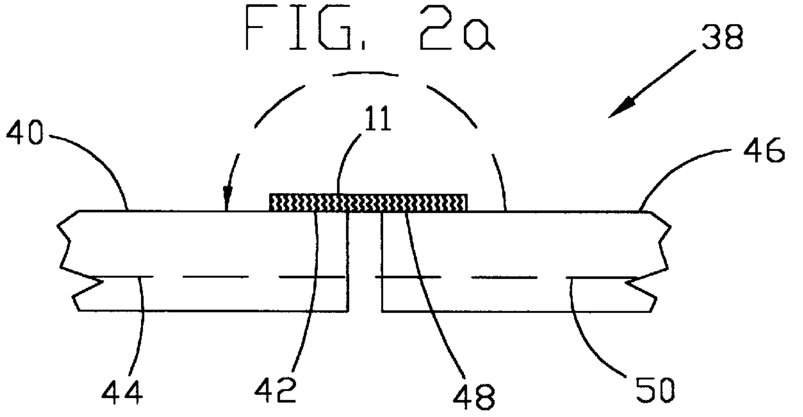
FIG. 2*a* is a side elevation view of a heat laminated fabric hinge capable of approximately 180° of rotation at a first extreme of rotation.
Figure 2B:
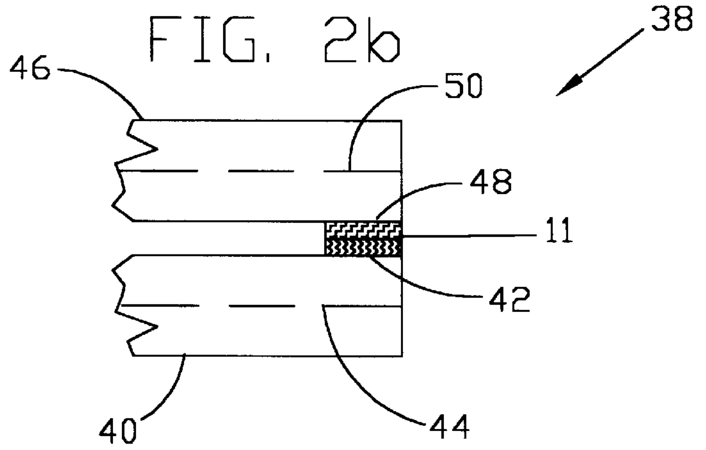
FIG. 2*b* is a side elevation view of the heat laminated fabric hinge of FIG. 2*a* at a second extreme of rotation.

FIGS. 2*a–b* show an embodiment of a heat laminated fabric hinge 38. The heat laminated fabric hinge 38 is comprised of a first member 40 with a hinge attachment surface 42, and a second member 46 with a hinge attachment surface 48. The heat laminated fabric hinge 38 also contains a fabric hinge member 11. The first member 40 contains a longitudinal axis 44 that is substantially parallel to the hinge attachment surface 42. Similarly, the second member 46 contains a longitudinal axis 50 that is substantially parallel to the hinge attachment surface 48. The heat laminated fabric hinge 38 pivots between a position where the longitudinal axis 44 of the first member 40 and the longitudinal axis 50 of the second member 46 are substantially coaxial to each other and a position where the longitudinal axis 44 of the first member 40 and the longitudinal axis 50 of the second member 46 are substantially parallel to each other. In this manner, the first member 40 and the second member 46 of the heat laminated fabric hinge 38 pivot through approximately 180° of rotation.

Figure 5:
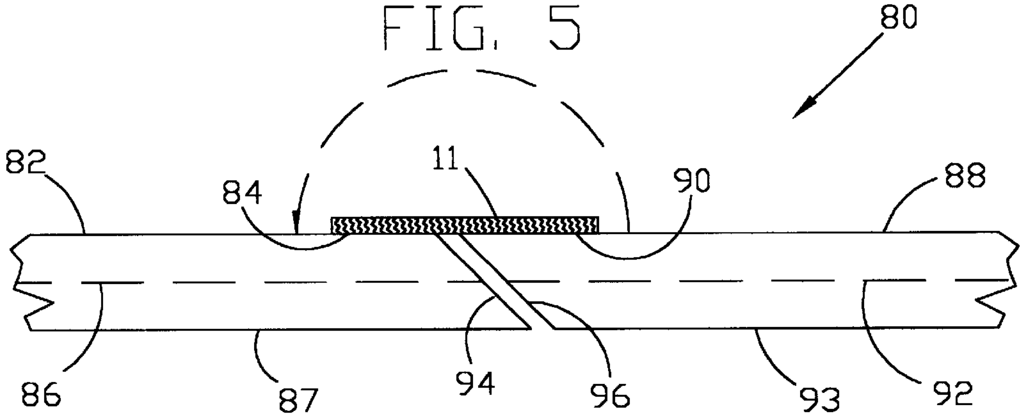
FIG. 5 is a side elevation view of an interlocking heat laminated fabric hinge.
Figure 6:
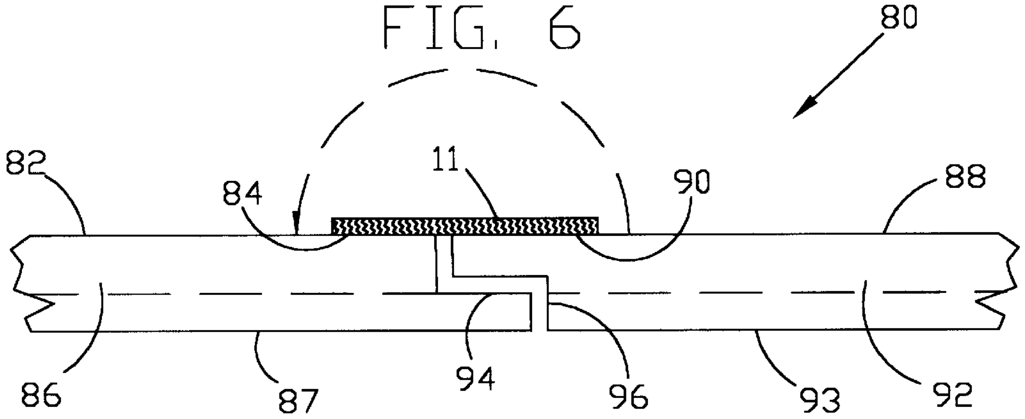
FIG. 6 is a side elevation view of another interlocking heat laminated fabric hinge.
Figure 7:
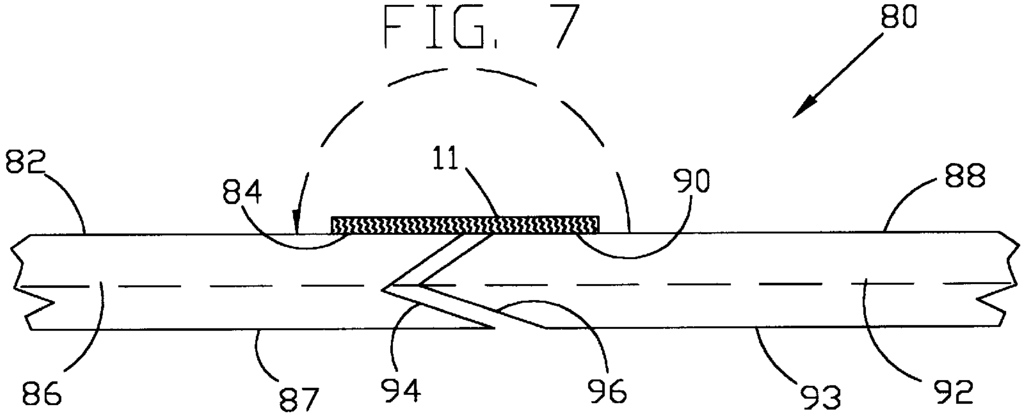
FIG. 7 is a side elevation view of yet another interlocking heat laminated fabric hinge.

FIGS. 5–7 show a heat laminated fabric hinge 80 that interlocks. The heat laminated fabric hinge 80 is comprised of a first member 82 with a hinge attachment surface 84, and a second member 88 with a hinge attachment surface 90. The first member 82 also contains a longitudinal axis 86 that is substantially parallel to the hinge attachment surface 84. Likewise, the second member 88 contains a longitudinal axis 92 that is substantially parallel to the hinge attachment surface 90. The heat laminated fabric hinge 80 also contains a fabric hinge member 11. The first member 82 of the heat laminated fabric hinge 80 contains an outer surface 82 and an interlocking surface 94. The hinge attachment surface 84 of the first member 82 and the outer surface 87 of the first member 82 are substantially parallel to each other, and the interlocking surface 94 lies between the hinge attachment surface 84 and the outer surface 87 of the first member 82 of the heat laminated fabric hinge 80. In the same manner, the second member 88 of the heat laminated fabric hinge 80 contains an outer surface 93 and an interlocking surface 96. The hinge attachment surface 90 of the second member 88 and the outer surface 93 of the second member 88 are substantially parallel to each other, and the interlocking surface 96 of the second member 88 lies between the hinge attachment surface 90 and the outer surface 93 of the second member 88 of the heat laminated hinge 80. In this manner, the interlocking surfaces 94, 96 of the first member 82 and the second member 88 of the heat laminated fabric hinge 80 align to each other when the hinge attachment surface 84 of the first member 82 and the hinge attachment surface 90 of the second member 88 are substantially coaxial with each other. In this orientation the fabric hinge member 11 is protected by the particular orientation of the interlocking surfaces 94, 96 of the first member 82 and the second member 88 of the heat laminated fabric hinge 80. The particular configurations of the heat laminated fabric hinge 80 shown in FIGS. 5–7 prevent tampering with the fabric hinge member 11 of the heat laminated fabric hinge 80, thus providing enhanced security. In other words, from the outer surfaces 94, 96 of the first member 82 and the second member 88 of the heat laminated fabric hinge 80 the fabric hinge member 11 is not directly accessible.

Figure 3A:
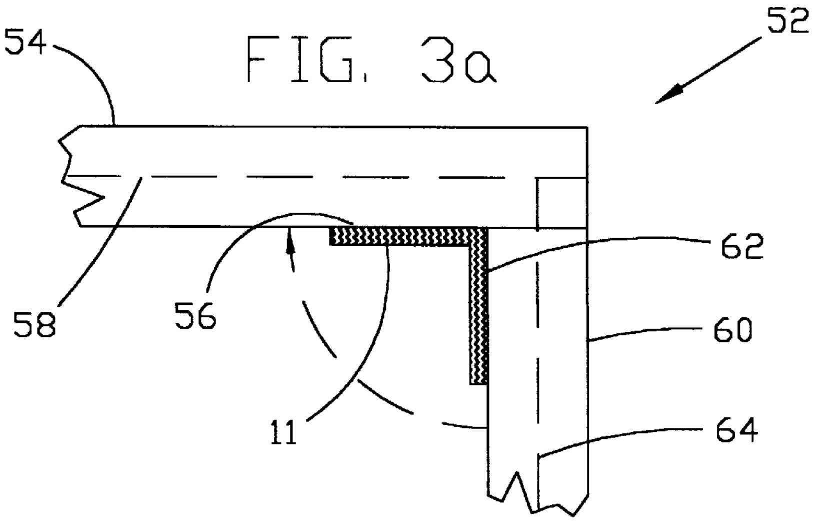
FIG. 3*a* is a side elevation view of a heat laminated fabric hinge capable of approximately 90° of rotation, at a first extreme of rotation.
Figure 3B:
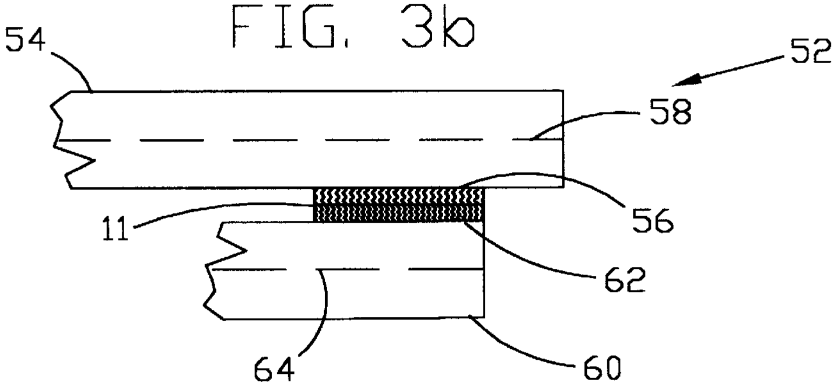
FIG. 3*b* is a side elevation view of the heat laminated fabric hinge of FIG. 3*a* at a second extreme of rotation.

FIGS. 3*a–b* show a heat laminated fabric hinge 52. The heat laminated fabric hinge 52 is comprised of a first member 54 with a hinge attachment surface 56, and a second member 60 with a hinge attachment surface 62. The first member 54 contains a longitudinal axis 58 that is oriented substantially parallel to the hinge attachment surface 56. The second member 60 of the heat laminated fabric hinge 52 contains a longitudinal axis 64 that is oriented substantially parallel to the hinge attachment surface 62 of the second member 60 of the heat laminated fabric hinge 52. The heat laminated fabric hinge 52 pivots between a position where the longitudinal axis 58 of the first member 54 and the longitudinal axis 64 of the second member 60 are substantially perpendicular to each other, and a position where the longitudinal axis 58 of the first member 54 and the longitudinal axis 64 of the second member 60 are substantially parallel to each other (FIGS. 3*a–b*). Configured in this manner the first member 54 and the second member 60 of the heat laminated fabric hinge 52 pivot through approximately 90° of rotation.

Figure 4A:
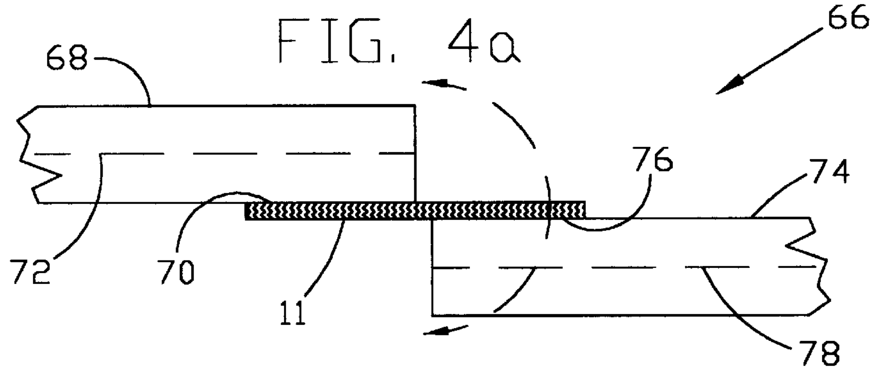
FIG. 4*a* is a side elevation view of another heat laminated fabric hinge capable of approximately 180° of rotation.
Figure 4B:
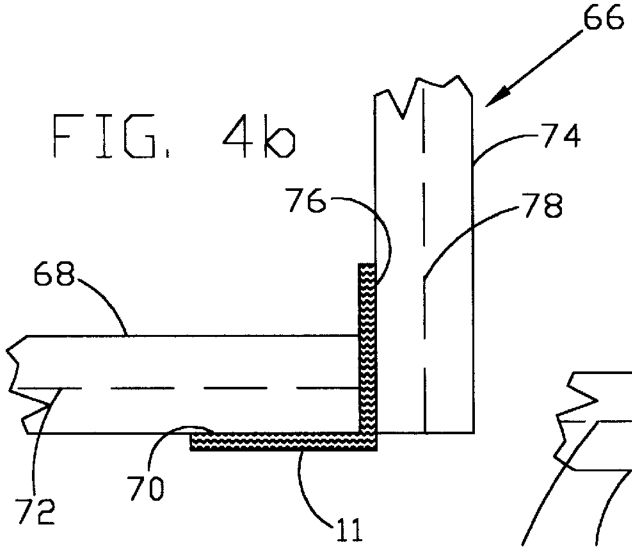
FIG. 4*b* is a side elevation view of the heat laminated fabric hinge of FIG. 4*a* at a first extreme of rotation.
Figure 4C:
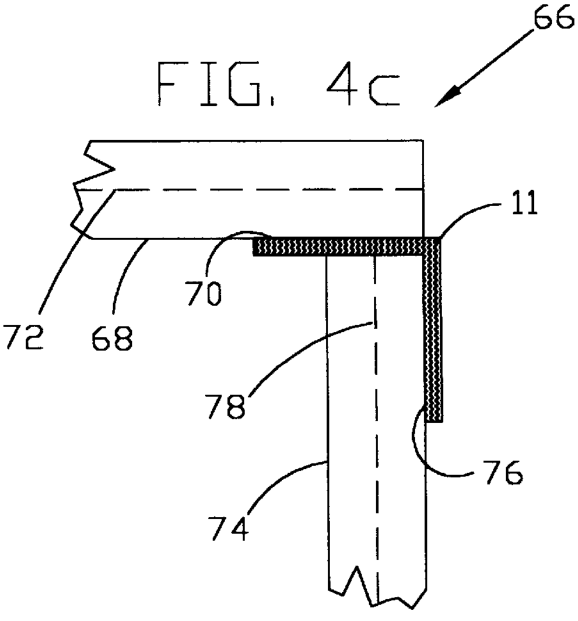
FIG. 4*c* is a side elevation view of the heat laminated fabric hinge of FIG. 4*a* at a second extreme of rotation.

FIGS. 4*a–c* show a heat laminated fabric hinge 66 comprised of a first member 68 with a hinge attachment surface 70, and a second member 74 with a hinge attachment surface 76. The first member 68 contains a longitudinal axis 72 that is substantially parallel to the hinge attachment surface 70. The second member 74 contains a longitudinal axis 78 that is substantially parallel to the hinge attachment surface 76. Configured in this manner the heat laminated fabric hinge 66 pivots between a position where the longitudinal axis 72 of the first member 68 and the longitudinal axis 78 of the second member 74 are substantially perpendicular to each other, and a position where the longitudinal axis 72 of the first member 68 and the longitudinal axis 78 of the second member 74 are substantially perpendicular to each other, while passing through a position where the longitudinal axis 72 of the first member 68 and the longitudinal axis 78 of the second member 74 are parallel to each other. Thus, the first member 68 and the second member 74 of the heat laminated fabric hinge 66 pivot through approximately 180° of rotation.

Figure 1A:
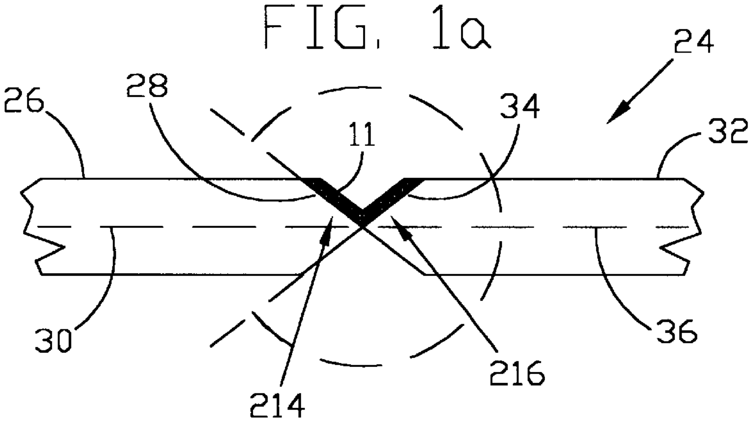
FIG. 1*a* is a side elevation view of a heat laminated fabric hinge capable of approximately 270° of rotation.
Figure 1B:
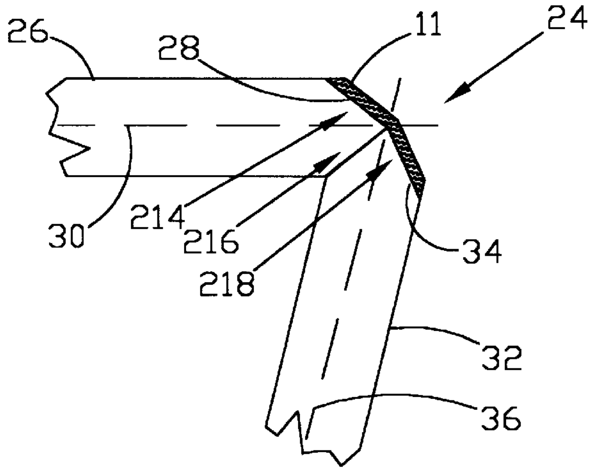
FIG. 1*b* is a side elevation view of the heat laminated fabric hinge of FIG. 1*a* at first extreme of rotation.
Figure 1C:
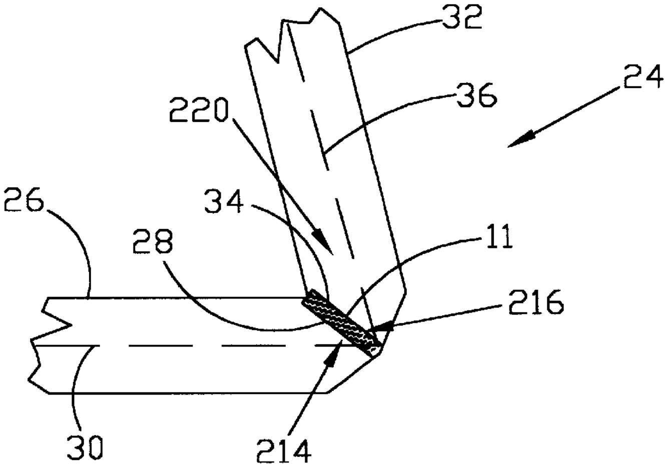
FIG. 1*c* is a side elevation view of the heat laminated fabric hinge of FIG. 1*a* at a second extreme of rotation.

FIGS. 1*a–c* show a heat laminated fabric hinge 24. The heat laminated fabric hinge 24 is comprised of a first member 26 with a hinge attachment surface 28, and a second member 32 with a hinge attachment surface 34. The first member 26 also contains a longitudinal axis 30 that intersects the hinge attachment surface 28 to form an acute angle 214. In the preferred embodiment the acute angle 214 is approximately 45°. The second member 32 contains a longitudinal axis 36 which intersects the hinge attachment surface 34 at an acute angle 216, and in the preferred embodiment of the invention the acute angle 216 is approximately 45°. The heat laminated fabric hinge 24 pivots between a position where the longitudinal axis 30 of the first member 26 and the longitudinal axis 36 of the second member 32 form a first acute angle 218 and a position where the longitudinal axis 30 of the first member 26 and the longitudinal axis 36 of the second member 32 form a second acute angle 220, while passing through a position where the longitudinal axis 30 of the first member 26 and the longitudinal axis 36 of the second member 32 are parallel to each other. Configured in this manner the first member 30 and the second member 32 of the heat laminated fabric hinge 24 pivot through approximately 270° of rotation. In the preferred embodiment of the invention the first acute angle 218 and the second acute angle 220 are approximately 45 degrees. However, it is anticipated that those of ordinary skill in the art will recognize that by altering the acute angle 214 between the longitudinal axis 30 of the first member 26 and the hinge attachment surface 28 of the first member 26, and by altering the acute angle 216 between the longitudinal axis 36 of the second member 32 and the hinge attachment surface 34 of the second member 32, the heat laminated fabric hinge 24 can pivot between more or less than 270° of rotation.

Figure 9A:
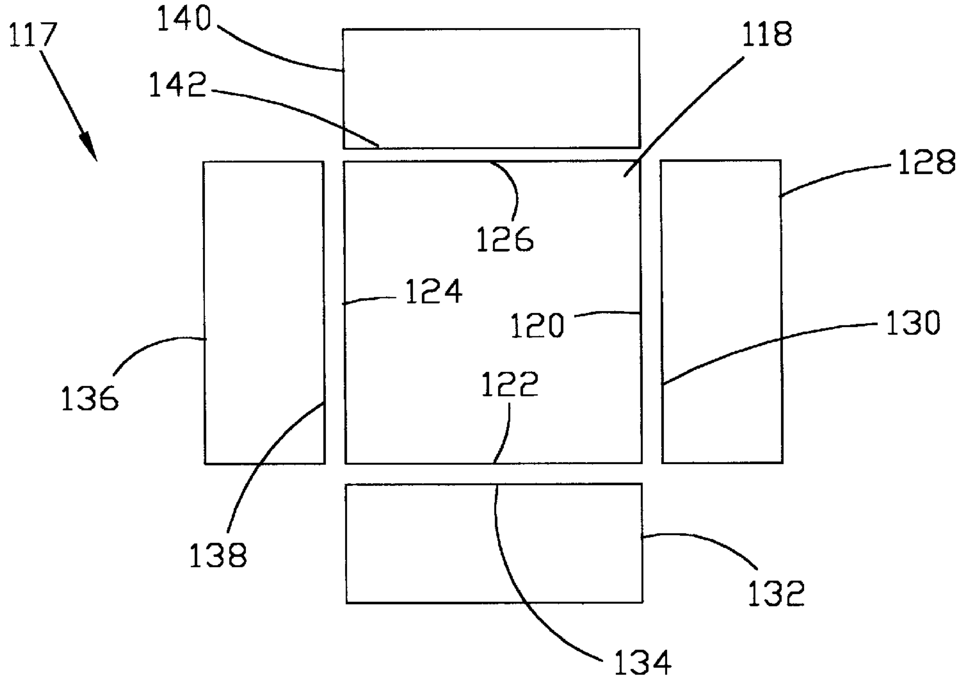
FIG. 9*a* is an exploded top plan view of the components of a heat laminated fabric hinge box.
Figure 9B:
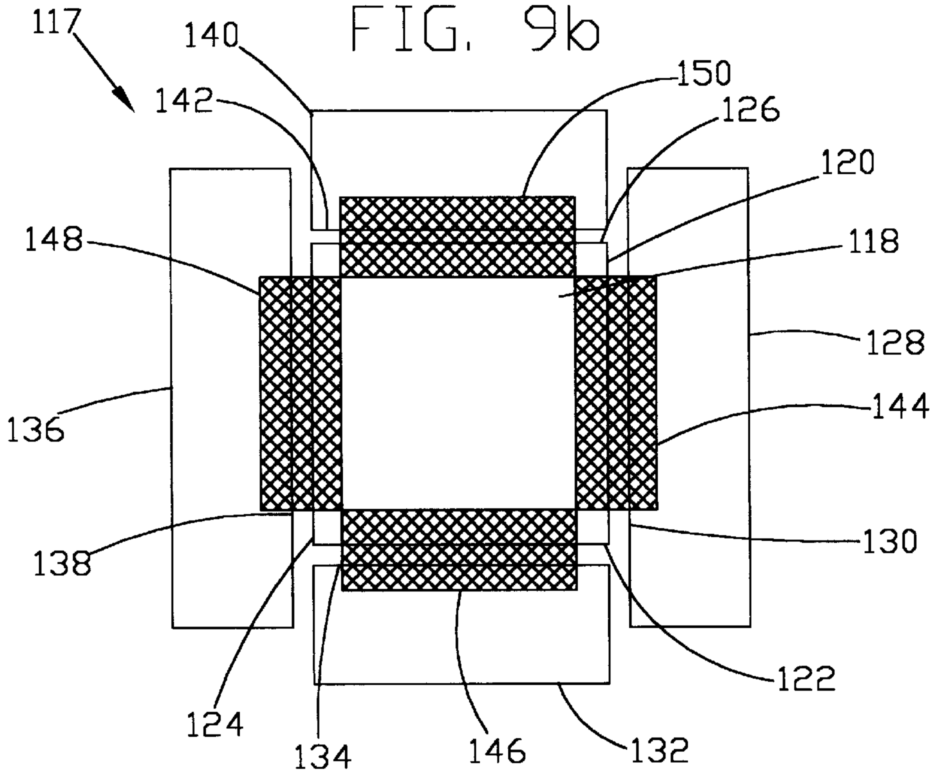
FIG. 9*b* is a top plan view of the heat laminated fabric hinge box of FIG. 9*a.* in a partially assembled form.
Figure 9C:
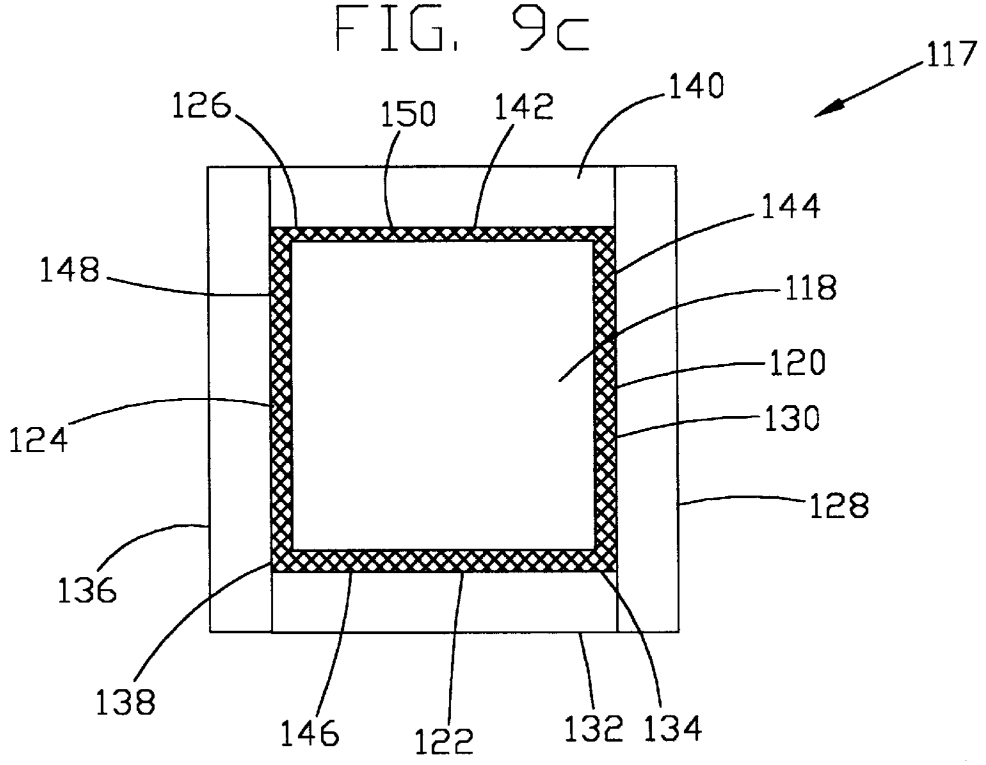
FIG. 9*c* is a top plan view of the heat laminated fabric hinge box of FIG. 9*b* in full assembled form.

FIGS. 9*a–c* show the use of heat laminated fabric hinges to produce a heat laminated fabric hinge box 117. The heat laminated fabric hinge box 117 is comprised of a bottom member 118 that is further comprised of a first hinge attachment surface 120, a second hinge attachment surface 122, a third hinge attachment surface 124, and a fourth hinge attachment surface 126. Additionally, the heat laminated fabric hinge box 117 also contains a first member 128 with a hinge attachment surface 130, a second member 132 with a hinge attachment surface 134, a third member 136 with a hinge attachment surface 138, and a fourth member 140 with a hinge attachment surface 142. The heat laminated fabric hinge box 117 also contains a first fabric hinge member 144, a second fabric hinge member 146, a third fabric hinge member 148, and a fourth fabric hinge member 150.

The various components of a heat laminated fabric hinge box 117 are configured such that the first fabric hinge member 144 is secured by heat lamination to the first hinge attachment surface 120 of the bottom member 118 and to the hinge attachment surface 130 of the first member 128. The second fabric hinge member 146 is secured by heat lamination to the second hinge attachment surface 122 of the bottom member 118 and to the hinge attachment surface 134 of the second member 132. The third fabric hinge member 148 is secured by heat lamination to the third hinge attachment surface 124 of the bottom member 118 and to the hinge attachment surface 138 of the third member 136. Finally, the fourth fabric hinge member 150 is secured by heat lamination to the fourth hinge attachment surface 126 of the bottom member 118 and to the hinge attachment surface 142 of the fourth member 140. Configured in this manner, the first member 128, second member 132, third member 136, and the fourth member 140 can pivot relative to the bottom member 118 to form the assembled heat laminated fabric hinge box 117 shown in FIG. 9*c*.

Figure 10A:
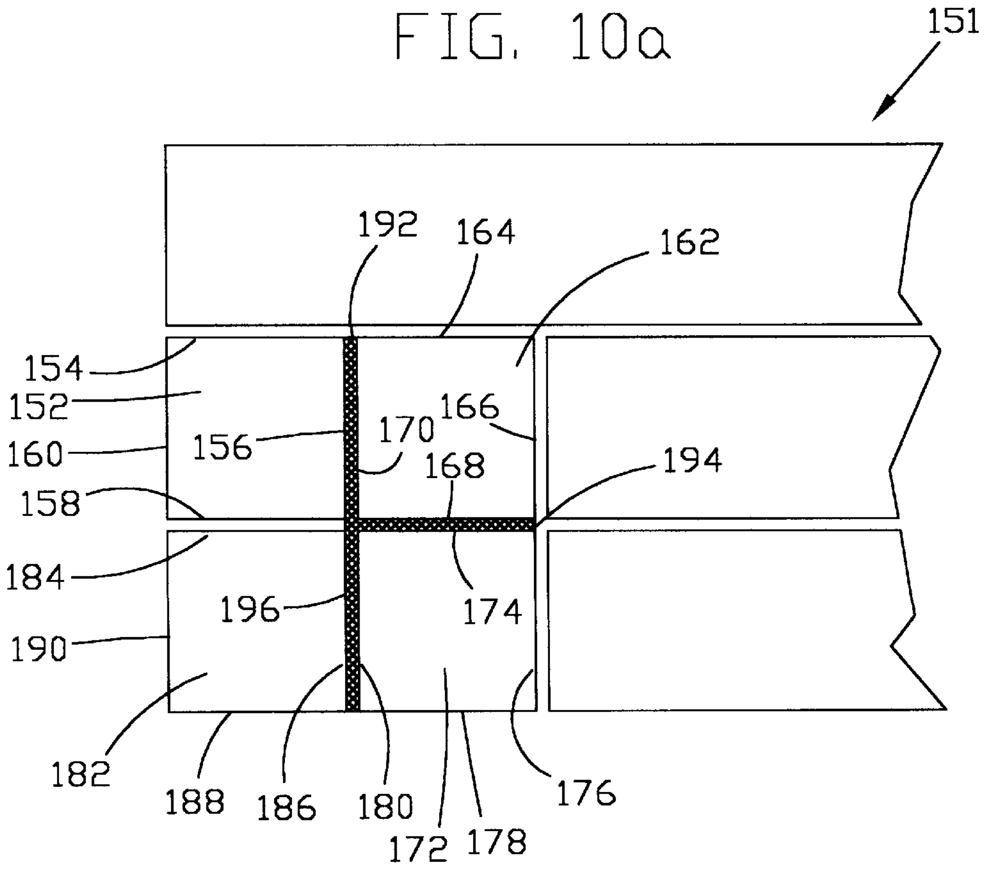
FIG. 10*a* is a side elevation view of a multi-directional heat laminated fabric hinge.
Figure 10B:
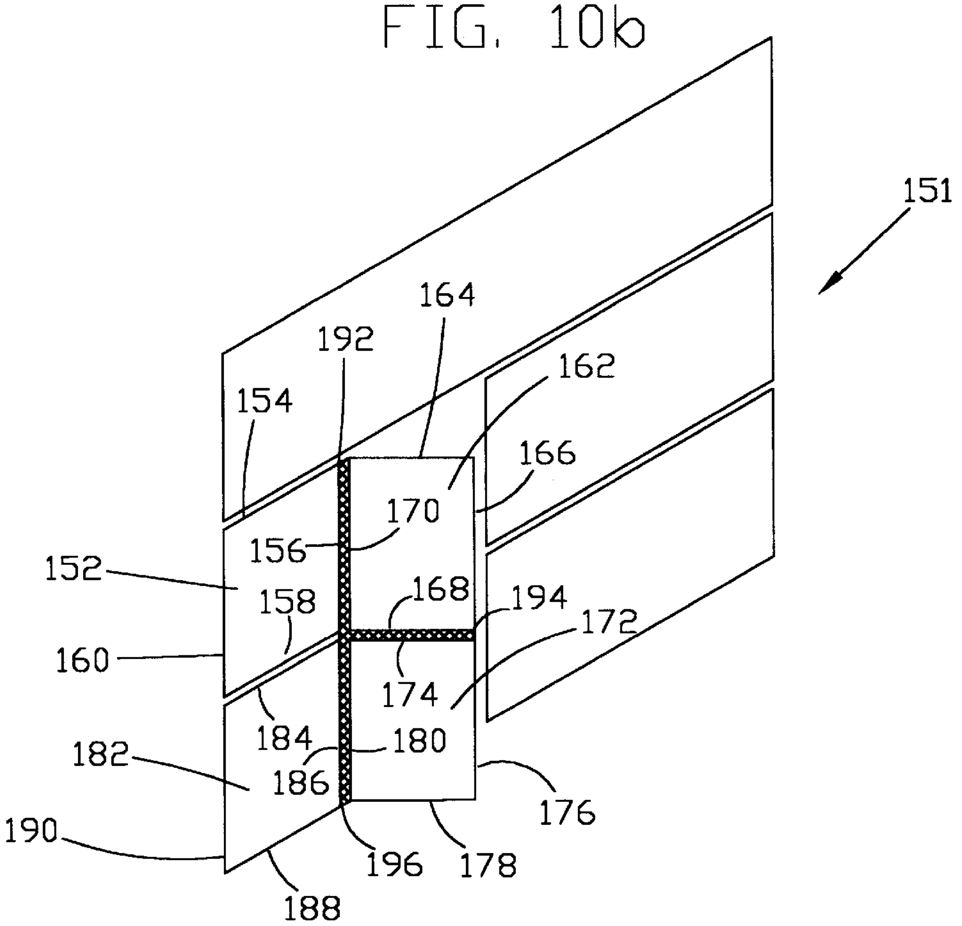
FIG. 10*b* is a perspective view of the multi-directional heat laminated fabric hinge of FIG. 10*a* in a first pivot position.
Figure 10C:
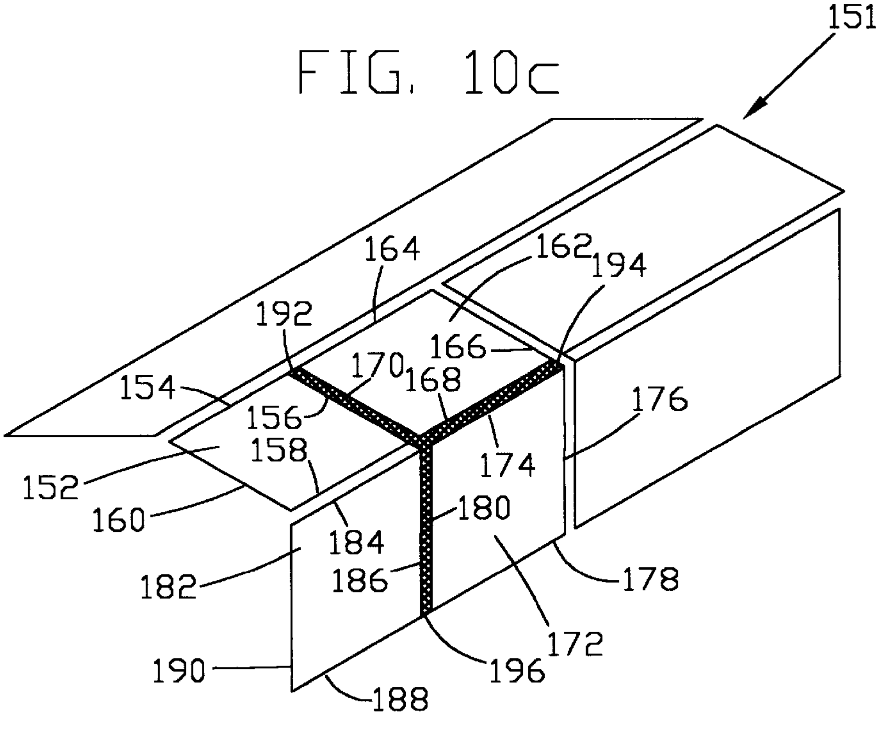
FIG. 10*c* is a perspective view of the multi-directional heat laminated fabric hinge of FIG. 10*a* in second pivot position.

FIGS. 10*a–c* show a multi-directional heat laminated fabric hinge 151. The multi-directional heat laminated fabric hinge 151 is comprised of a first member 152, a second member 162, a third member 172, and a fourth member 182. The first member 152 of the multi-directional heat laminated fabric hinge 151 is further comprised of a first side 154, a second side 156, a third side 158, and a fourth side 160. The second member 162 of the multi-directional heat laminated fabric hinge is further comprised of a first side 164, a second side 166, a third side 168, and a fourth side 170. The third member 172 of the multi-directional heat laminated fabric hinge 151 is further comprised of a first side 174, a second side 176, a third side 178, and a fourth side 180. Finally, the fourth member 182 of the multi-directional heat laminated fabric hinge 151 is further comprised of a first side 184, a second side 186, a third side 188, and fourth side 190. The multi-directional heat laminated fabric hinge 151 also contains a first fabric hinge member 192, a second fabric hinge member 194, and a third fabric hinge member 196. It is anticipated that those of ordinary skill in the art will understand that the first fabric hinge member 192, second fabric hinge member 194, and the third fabric hinge member 196 could comprised of individual fabric hinge members or components of a single fabric hinge member.

The components of the multi-directional heat laminated fabric hinge 151 are oriented in the following manner. The first fabric hinge member 192 is secured by heat lamination to the second side 156 of the first member 152 and to the fourth side 170 of the second member 162. The second fabric hinge member 194 is secured by heat lamination to the third side 168 of the second member 162 and to the first side 174 of the third member 172. The third fabric hinge member 196 is secured by heat lamination to the fourth side 180 of the third member 172 and to the second side 186 of the fourth member 182. Configured in this manner, the multi-directional heat laminated fabric hinge 151 can pivot in two directions. FIG. 10*b* shows that the multi-directional heat laminated fabric hinge 151 can pivot in a manner such that the second member 162 and the third member 172 pivot relative to the first member 152 and the fourth member 182. FIG. 10*c* shows that the multi-directional heat laminated fabric hinge 151 can pivot in a manner such that the first member 152 and the second member 162 pivot relative to the third member 172 and the fourth member 182. In this manner, the multi-directional heat laminated fabric hinge 151 can be used to create a hinge commonly referred to as a Judas Gate.

Figure 8A:
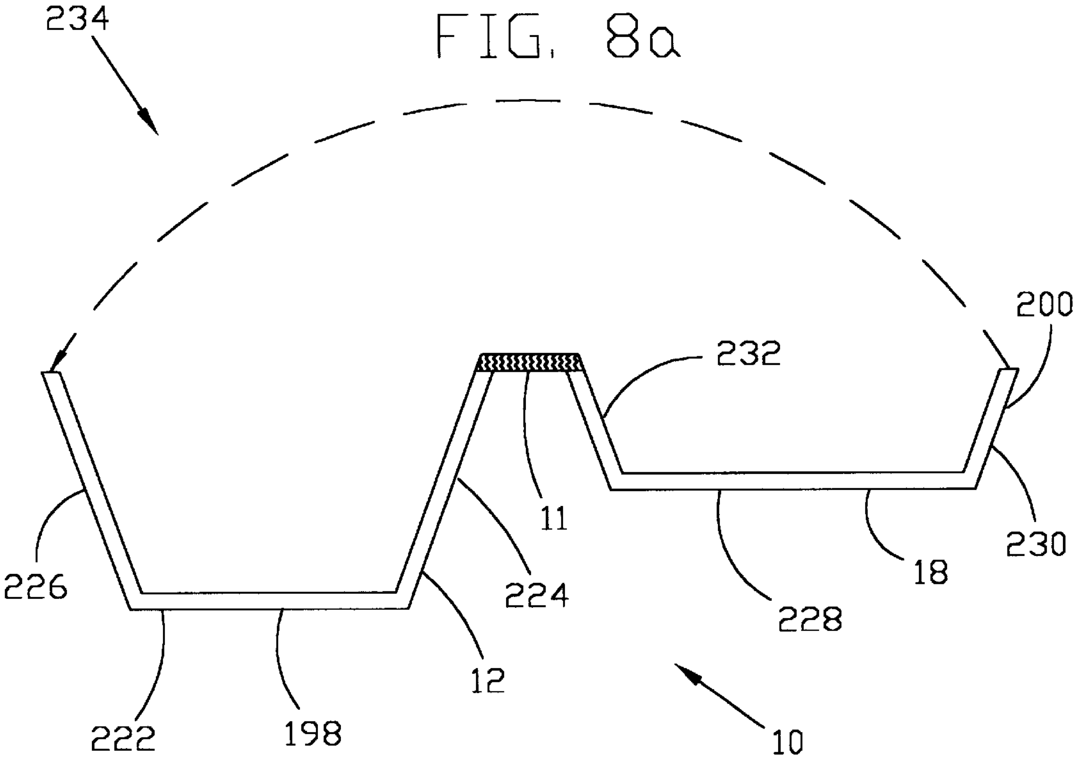
FIG. 8*a* is a side elevation view of a heat laminated fabric hinge for a box in an open position.
Figure 8B:
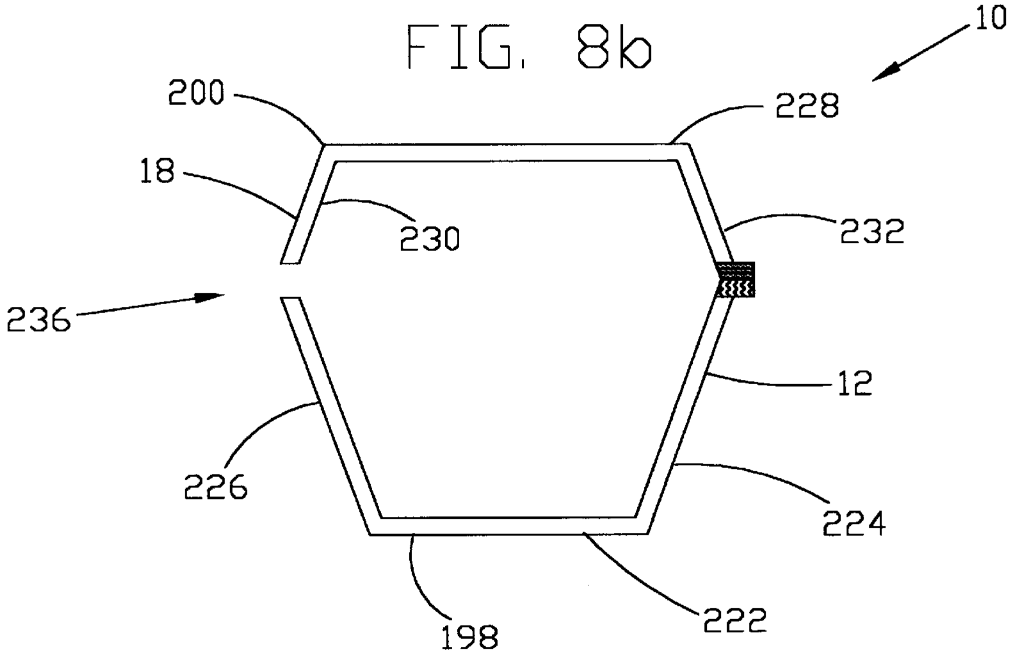
FIG. 8*b* is a side elevation view of the heat laminated fabric hinge for a box depicted in FIG. 8*a* in a closed position.

FIGS. 8*a–b* show an alternative embodiment of the heat laminated fabric hinge 10 depicted in FIGS. 15*a–b*. In this configuration the first member 12 actually comprises a lower box section 198. The lower box section 198 is comprised of a bottom 222, a first side 224, and a second side 226. Further, the lower box section 198 contains a front side and a back side (not shown) which attach to the bottom 222 to form a fully enclosed box section. The second member 18 actually comprises an upper box section 200. The upper box section 200 is further comprised of a top 228, a first side 230, and a second side 232. The upper box section 200 also contains a front side and a back side (not shown) connected to the top 228 such that the upper box section 200 is fully enclosed. Thus, the heat laminated fabric hinge 10 can pivot between an open position 234 shown in FIG. 8*a* and a closed position 236 depicted in FIG. 8*b*. In this manner the heat laminated fabric hinge 10 can be used to create a hinge for fully enclosed boxed structure.

The heat laminated fabric hinges of the present invention contain numerous advantages over prior art hinges. The heat laminated fabric hinges can function in a wide variety of operating conditions including freezing conditions, extreme heat, exposure to dirt and grime, and exposure to corrosive chemicals. The heat laminated fabric hinges of the present invention have the advantage of resisting the deleterious effects of operating in the aforementioned environments. Additionally, the heat laminated fabric hinges of the present invention require essentially no maintenance and operate silently. Further, by heat laminating the components of the heat laminated fabric hinge, these components will not separate or delaminate like hinges constructed with adhesive or solvent materials. Additionally, eliminating the need to use adhesives or solvents greatly increases the range of materials available to construct the heat laminated fabric hinges of the present invention. Many materials resist adhesion with adhesives or solvents and/or are damaged by adhesives or solvents. Another advantage of the heat laminated fabric hinges of the present invention comprises the wide range of configurations possible using the aforementioned method. Additionally, the heat laminated fabric hinges of the present invention can be constructed with nearly unlimited bending radius, can bend in either direction, can bend without the hinge itself creating any restrictions to movement, and allow for an aesthetically pleasing appearance through the selection of the fabric of the fabric hinge member.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing form the scope of the invention. For example, the heat laminated fabrics hinges could be modified to utilizes more than one fabric hinge member secured by heat lamination to more than one hinge attachment surface.

I claim:

1. A method for producing a heat laminated fabric hinge where a fabric hinge member is heat laminated to a first member and a second member to accomplish a long lasting durable bond therebetween resulting in a silent operating and corrosion-resistant hinge, said method comprising:

a) providing a first member having a hinge attachment surface thereon;

b) providing a second member having a hinge attachment surface thereon;

c) providing a fabric hinge member comprising fibers;

d) providing a heating element;

e) arranging said fabric hinge member such that said fabric hinge member is in contact with said hinge attachment surfaces of said first and second members;

f) applying said heating element to said fabric hinge member until said hinge attachment surfaces of said first and second members become pliable enough to securably receive at least some of the fibers of said fabric hinge member; and g) embedding at least some of said fibers of said fabric hinge member into said pliable hinge attachment surfaces of said first and second members.

2. The invention in accordance with claim 1 wherein said first and said second members are comprised of thermoplastic material.

3. The invention in accordance with claim 1 wherein said fabric hinge member is a woven fabric.

4. The invention in accordance with claim 1 wherein said fabric hinge member is a non-woven material.

5. The invention in accordance with claim 1 further comprising the step of pre-heating said fabric hinge member prior to arranging said fabric hinge member in contact with said hinge attachment surfaces of said first and said second hinge members.

6. The invention in accordance with claim 5 wherein said fabric hinge member is pre-heated to approximately 95% of a melt temperature of said hinge attachment surfaces of said first and said second members.

7. The invention in accordance with claim 1 further comprising the step of pre-heating said hinge attachment surfaces of said first and said second members prior to arranging said fabric hinge member in contact with said hinge attachment surfaces of said first and said second hinge members.

8. The invention in accordance with claim 7 wherein said hinge attachment surfaces of said first and said second members are pre-heated to approximately 95% of a melt temperature of said hinge attachment surfaces of said first and said second members.

9. The invention in accordance with claim 1 wherein said heating element is heated to a temperature of approximately 105% of a melt temperature of said hinge attachment surfaces of said first and said second members prior to applying said heating element to said fabric hinge member.

10. The invention in accordance with claim 1 wherein said step of embedding at least some of said fibers of said fabric hinge member into said hinge attachment surfaces of said first and said second members further comprises pressing said fabric hinge member into said hinge attachment surfaces of said first and said second members with said heating element.

11. A method for producing a heat laminated fabric hinge where a fabric hinge member is heat laminated to a first member and second member to accomplish a long lasting durable bond therebetween resulting in a silent operating and corrosion-resistant hinge, said method comprising:

a) providing a first thermoplastic member having a hinge attachment surface thereon;

b) providing a second thermoplastic member having a hinge attachment surface thereon;

c) providing a woven fabric hinge member comprising fibers;

d) providing a heating element heated to a temperature of approximately 105% of a melt temperature of said hinge attachment surfaces of said first and second members;

e) pre-heating said fabric hinge member and said hinge attachment surfaces of said first and second members to approximately 95% of a melt temperature of said hinge attachment surfaces of said first and second members;

f) arranging said pre-heated fabric hinge member such that said fabric hinge member is in contact with said pre-heated hinge attachment surfaces of said first and second members;

g) applying said heating element to said fabric hinge member until said hinge attachment surfaces of said first and second members become pliable enough to securably receive at least some of the fibers of said fabric hinge member; and h) embedding at least some of said fibers of said fabric hinge member into said hinge attachment surfaces of said first and second member by pressing said fabric hinge member into said hinge attachment surfaces of said first and second members with said heating element.

12. A method of making a laminated fabric hinge, comprising:

a) heating a hinge attachment surface with a heating element until the hinge attachment surface becomes pliable enough to securably receive at least a portion of a fabric hinge; and b) embedding at least a portion of the fabric hinge into the hinge attachment surface.

13. The method of claim 12, wherein the act of heating the hinge attachment surface comprises:

arranging the fabric hinge such that the fabric hinge is in contact with the hinge attachment surface; and applying the heating element to the fabric hinge.

14. The method of claim 12, further comprising:

pre-heating the hinge attachment surfaces to approximately 95% of its melt temperature.

15. The method of claim 12, wherein the act of embedding at least a portion of the fabric hinge into the hinge attachment surface comprises:

pressing the fabric hinge into the hinge attachment surface with the heating element.

16. The method of claim 12, wherein the heating element comprises an electrical contact heater.

17. A method for producing a heat laminated fabric hinge where a fabric hinge member is heat laminated to a first member and a second member to accomplish a long-lasting durable bond therebetween resulting in a silent operating and corrosion resistant hinge, said method comprising:

(a) providing a first member having a hinge attachment surface thereon;

(b) providing a second member having a hinge attachment surface thereon;

(c) providing a fabric hinge member comprising fibers;

(d) providing a heat element;

(e) pre-heating said fabric hinge member with said heating element;

(f) arranging said fabric hinge member such that said fabric hinge member is in contact with said hinge attachment surfaces of said first and second members;

(g) applying said heating element to said fabric hinge member until said hinge attachment surfaces of said first and second members become pliable enough to securely receive at least some of the fibers of said fabric hinge member; and (h) embedding at least some of said fibers of said fabric hinge member into said pliable hinge attachment surfaces of said first and second members.

18. The invention in accordance with claim 17 wherein said fabric hinge member is pre-heated to approximately 95% of a melt temperature of said hinge attachment surfaces of said first and said second members.

19. A method of making a laminated hinge, comprising:

(a) pre-heating a hinge attachment surface;

(b) heating the hinge attachment surface with a heating element until the hinge attachment surface becomes pliable enough to securely receive a portion of a fabric hinge; and (c) embedding at least a portion of the fabric hinge into the hinge attachment surface.

20. The invention in accordance with claim 19, wherein said hinge attachment surface is pre-heated to approximately 95% of its melt temperature.

21. A heat laminated fabric hinge having a first member and a second member heat laminated to a fabric hinge member to provide a long lasting durable bond therebetween and resulting in a silent operating and corrosion-resistant hinge, said heat laminated fabric hinge comprising:

a) a first member with a hinge attachment surface thereon, said first member having a longitudinal axis substantially parallel to said hinge attachment surface of said first member;

b) a second member with a hinge attachment surface thereon, said second member having a longitudinal axis substantially parallel to said hinge attachment surface of said second member; and c) a fabric hinge member comprising fibers secured by heat lamination to said hinge attachment surface of said first member and to said hinge attachment surface of said second member such that at least some of the fibers of said fabric hinge member are embedded within said hinge attachment surfaces of said first and said second members, said fabric hinge member being secured such that said longitudinal axis of said first member and said longitudinal axis of said second member pivot between a position wherein said longitudinal axes are substantially coaxial to each other and a position wherein said axes are substantially parallel to each other.

22. The invention in accordance with claim 21 wherein said first member further comprises an outer surface parallel to said hinge attachment surface and an interlocking surface between said hinge attachment surface and said outer surface, and wherein said second member further comprises an outer surface parallel to said hinge attachment surface and an interlocking surface between said hinge attachment surface and said outer surface, and said interlocking surfaces of said first member and said second member align to each other when said hinge attachment surface of said first member is coxially aligned with said hinge attachment surface of said second member such that said first member and said second member interlock to prevent direct access to said fabric hinge member from said outer surfaces of said first and said second members.

23. The invention in accordance with claim 21 wherein said fabric hinge member is a woven fabric.

24. The invention in accordance with claim 21 wherein said fabric hinge member is a non-woven fabric.

25. A heat laminated fabric hinge having a first member and a second member heat laminated to a fabric hinge member to provide a long lasting durable bond therebetween and resulting in a silent operating and corrosion-resistant hinge, said heat laminated fabric hinge comprising:

a) a first member with a hinge attachment surface thereon, said first member having a longitudinal axis substantially parallel to said hinge attachment surface of said first member;

b) a second member with a hinge attachment surface thereon, said second member having a longitudinal axis substantially parallel to said hinge attachment surface of said second member; and c) a fabric hinge member comprising fibers secured by heat lamination to said hinge attachment surface of said first member and to said hinge attachment surface of said second member such that at least some of the fibers of said fabric hinge member are embedded within said hinge attachment surfaces of said first and said second members, said fabric hinge member being secured such that said longitudinal axis of said first member and said longitudinal axis of said second member pivot between a position wherein said longitudinal axes are substantially perpendicular to each other and a position wherein said axes are substantially perpendicular to each other while passing through a position wherein said longitudinal axes are parallel to each other.

26. A heat laminated fabric hinge having a first member and a second member heat laminated to a fabric hinge member to provide a long lasting durable bond therebetween and resulting in a silent operating and corrosion-resistant hinge, said heat laminated fabric hinge comprising:

a) a first member with a hinge attachment surface thereon, said first member having a longitudinal axis, said hinge attachment surface of said first member and said longitudinal axis of said first member forming an acute angle with respect to each other;

b) a second member with a hinge attachment surface thereon, said second member having a longitudinal axis, said hinge attachment surface of said second member and said longitudinal axis of said second member forming an acute angle with respect to each other; and c) a fabric hinge member comprising fibers secured by heat lamination to said hinge attachment surface of said first member and to said hinge attachment surface of said second member such that at least some of the fibers of said fabric hinge member are embedded within said hinge attachment surfaces of said first and said second members, said fabric hinge member being secured such that said longitudinal axis of said first member and said longitudinal axis of said second member pivot between a position wherein said longitudinal axes are substantially perpendicular to each other and a position wherein said axes form a first acute angle and a position wherein said axes form a second acute angle while passing through a position wherein said longitudinal axes are parallel to each other.

* * * * *